United States Patent
Shin et al.

(10) Patent No.: US 11,227,396 B1
(45) Date of Patent: Jan. 18, 2022

(54) CAMERA PARAMETER CONTROL USING FACE VECTORS FOR PORTAL

(71) Applicant: Facebook, Inc., Menlo Park, CA (US)

(72) Inventors: Mooyoung Shin, Redwood City, CA (US); Hao Sun, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 7 days.

(21) Appl. No.: 16/930,776

(22) Filed: Jul. 16, 2020

(51) Int. Cl.
  G06T 7/246 (2017.01)
  G06K 9/00 (2006.01)

(52) U.S. Cl.
  CPC .......... *G06T 7/251* (2017.01); *G06K 9/00255* (2013.01); *G06K 9/00275* (2013.01); *G06K 9/00744* (2013.01)

(58) Field of Classification Search
  CPC .... G06K 9/52; G06K 9/0063; G06K 9/00832; G06K 9/6202; G06K 9/00275; G06K 9/00744; G06K 9/00255; G06T 7/20; G06T 2207/10016; G06T 7/215; G06T 7/251
  See application file for complete search history.

(56) References Cited

U.S. PATENT DOCUMENTS

| | | | | |
|---|---|---|---|---|
| 6,081,606 A * | 6/2000 | Hansen | ............. | G06K 9/00771 348/699 |
| 2005/0163218 A1 * | 7/2005 | Le Clerc | ................... | G06T 7/20 375/240.16 |
| 2007/0297645 A1 * | 12/2007 | Pace | .................... | G06K 9/6203 382/103 |
| 2014/0254951 A1 * | 9/2014 | Salvador | ................ | G06T 5/003 382/255 |
| 2015/0030208 A1 * | 1/2015 | Fragoulis | ............... | G06T 7/269 382/107 |
| 2015/0189318 A1 * | 7/2015 | Pace | .................... | H04N 19/543 375/240.08 |

OTHER PUBLICATIONS

Tracking and Recognizing Rigid and Non-Rigid Facial Motions using Local Parametric Models of Image Motion (Year: 1995).*
Object Tracking Using Motion-Adaptive Modeling of Scene Content (Year: 1996).*
Face Detection Based on Adaptive Support Vector Tracker (Year: 2011).*
A Survey on Face Detection in the wild: past, present and future (Year: 2015).*
A Survey of Recent Advances in Face Detection (Year: 2010).*

* cited by examiner

Primary Examiner — Nizar N Sivji
(74) Attorney, Agent, or Firm — Fenwick & West LLP

(57) ABSTRACT

A method of performing adjustment of a convergence speed for an imaging parameter is based on detecting a motion of a selected face in a sequence of image frames. When the detected motion meets predefined motion criteria, a motion vector corresponding to the characterized motion of the face is computed. A value for a convergence adjustment factor for adjusting a convergence speed of an imaging parameter of the camera is determined based on the computed motion vector. The convergence speed of the imaging parameter of the camera is adjusted based on the determined value of the convergence adjustment factor.

20 Claims, 6 Drawing Sheets

600

Receive sequence of image frames of video data of a scene from a camera on a client device
610

↓

Detect motion data characterizing motion of a face in the scene from the received sequence of video frames
620

↓

Determine that the motion data meets predefined motion criteria
630

↓

Responsive to the motion data meeting the predefined motion criteria, compute motion vector corresponding to motion of the face
640

↓

Determine a value of a convergence adjustment factor based on computed motion vector for adjusting a convergence speed of an imaging parameter of the camera
650

↓

Adjust convergence speed of the imaging parameter of the camera based on the value of the convergence adjustment factor
660

CAMERA PARAMETER CONTROL USING FACE VECTORS FOR PORTAL

BACKGROUND

With growing popularity of stand-alone communication devices (e.g., smart phones, smart home devices), accurate reproduction of an imaged scene is an important application. For communication devices to provide hand-free operation while being located far field within an environment, maintaining good image quality of any reproduced images for a target user is desired. However, the image quality may suffer from factors such as image adjustment that arise from the imaging systems, influence of device placement, and the environment as a target user moves around the space. There is a need for providing high quality images in communication devices that are located far field within the environment.

SUMMARY

This disclosure relates generally to maintaining image quality in video sequences captured and displayed by a client device, and more specifically to using motion information of imaged individuals within an imaged scene to adjust imaging parameters for capturing further image frames of the scene.

Embodiments relate to adjusting a convergence speed of one or more imaging parameters of a camera located on the client device based on computing a motion vector for an imaged face in the scene from image frames of video data. A sequence of image frames of video data is received from a camera on a client device. Motion data that characterizes motion of a face in the scene is detected from the sequence of image frames. When it is determined that the detected motion data meets one or more predefined motion criteria, a motion vector corresponding to the characterized motion of the face is computed. A value is determined for a convergence adjustment factor that is subsequently used for adjusting a convergence speed of an imaging parameter of the camera based on the computed motion vector. The convergence speed of the imaging parameter of the camera is adjusted based on the determined value of the convergence adjustment factor.

A list of detected faces in an image frame is received, along with associated face parameter values. A face is selected from the list of faces, and when it is determined that the selected face is the same across a pair of consecutive image frames including a current image frame, the motion data characterizing the motion of the face is calculated using an area of overlap of bounding boxes for a location of the selected face in each of a pair of consecutive image frames. When it is determined that the detected motion data meets predefined motion criteria, the motion vector corresponding to the characterized motion of the face is computed. The computed motion vector is based on minimizing a cost function. Subsequently, the value of the convergence adjustment factor is determined based on the computed motion vector by applying a model to the computed motion vector.

BRIEF DESCRIPTION OF THE DRAWINGS

FIG. 6 is a flowchart illustrating a process for adjusting imaging parameters of a camera based on computed motion of a face that is detected in a sequence of video frames, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
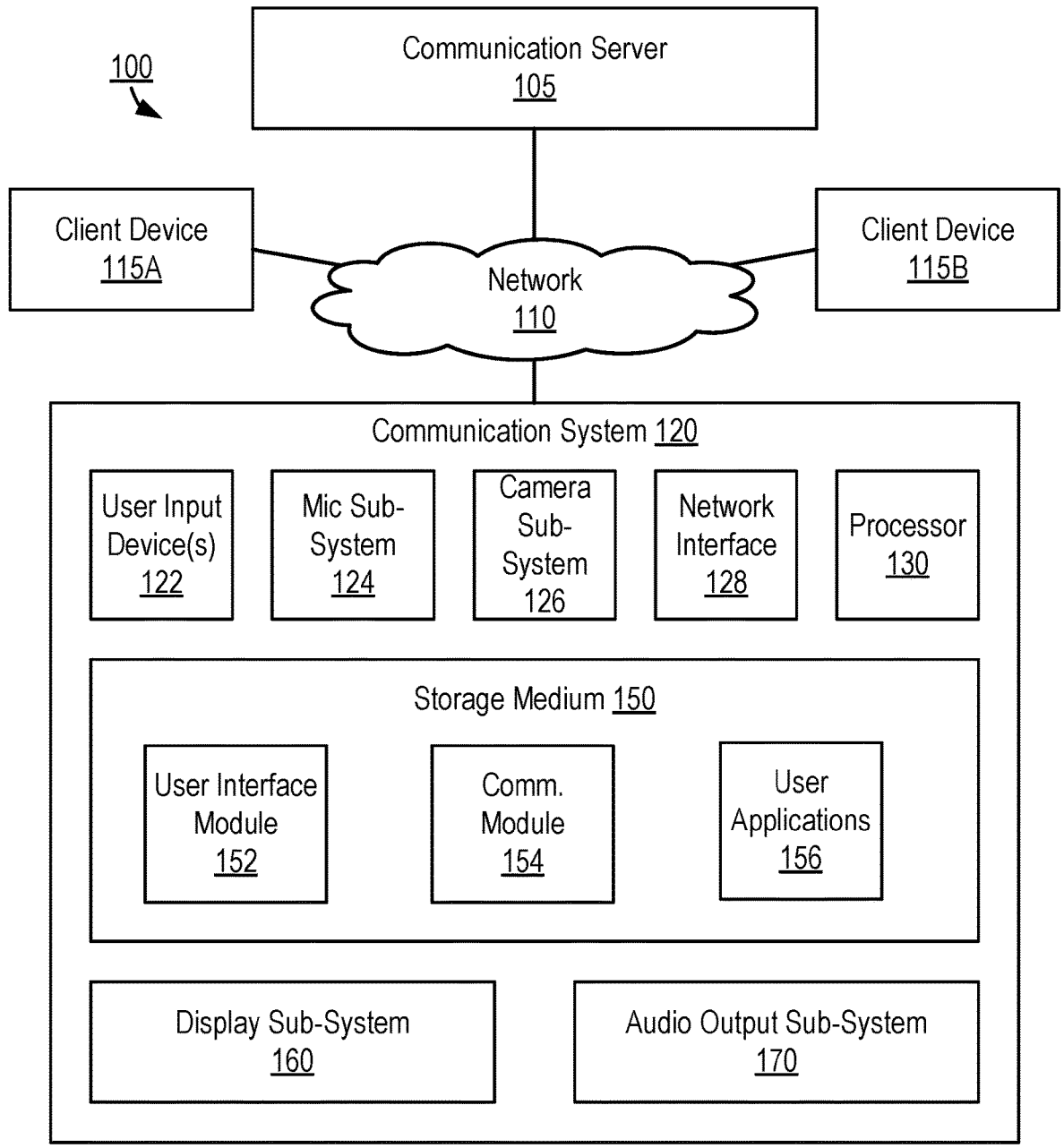
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises an integrated computing device that operates as a standalone network-enabled device. In another embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 105.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a display sub-system 160, and an audio sub-system 170. In other embodiments, the communication system 120 may include additional, fewer, or different components.

The communication server 105, the communication system 120, and the client devices 115 cooperatively and/or individually maintain and enforce one or more privacy settings for users or people identified from captured video data or other data in various embodiments. A privacy setting of a user or person determines how particular information associated with a user or person can be shared, and may be stored in association with information identifying the user or the person. In some embodiments, the communication system 120 retrieves privacy settings for one or more users maintained by the communication server 105. In one embodiment, a privacy setting specifies particular information associated with a user and identifies other entities with whom the specified information may be shared. Examples of entities with which information can be shared may include other users, applications, third party systems, or any entity that can potentially access the information. Examples of information that can be shared by a user include image data including the user or the person, audio data including audio captured from the user or the person, video data including the user or the person, and the like.

For example, in particular embodiments, privacy settings may allow a first user to specify (e.g., by opting out, by not opting in) whether the communication server 105 may receive, collect, log, or store particular objects or information associated with the user for any purpose. In particular embodiments, privacy settings may allow the first user to specify whether particular video capture devices, audio capture devices, applications or processes may access, store, or use particular objects or information associated with the user. The privacy settings may allow the first user to opt in or opt out of having objects or information accessed, stored, or used by specific devices, applications or processes. The communication server 105 may access such information in order to provide a particular function or service to the first user, without the communication server 105 having access to that information for any other purposes. Before accessing, storing, or using such objects or information, the communication server 105 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the communication server 105.

The privacy settings maintained and enforced by the communication server 105 and/or the communication system 120, or the client devices 115 may be associated with default settings. In various embodiments, the communication system 120 does not identify a user within captured video data, audio data, image data, or other data unless the communication system 120 obtains a privacy setting from the user authorizing the communication system 120 to identify the user. For example, a privacy setting associated with a user has a default setting preventing the communication system 120 from identifying the user, so the communication system 120 does not identify the user unless the user manually alters the privacy setting to allow the communication system 120 to identify the user. Additionally, an alternative privacy setting regulates transmission of information from a client device 115 identifying the user to another entity (e.g., another client device 115, the communication server 105, a third-party system) in various embodiments. The alternative privacy setting has a default setting preventing transmission of information identifying the user in various embodiments, preventing client device 115 from transmitting information identifying the user to other entities unless the user manually modifies the alternative privacy setting to authorize transmission. The communication system 120 maintains the one or more privacy settings for each user identified from captured video data or other data, allowing user-specific control of transmission and identification of each user. In some embodiments, the communication system 120 prompts a person to provide privacy settings when the communication system 120 initially identifies the person from captured data and stores the provided privacy settings in association with information identifying the person.

In various embodiments, for the communication server 105 and/or various components client device 115 that have functionalities that may use, as inputs, personal or biometric information of a user for user-authentication or experience-personalization purposes, a user may opt to make use of these functionalities to enhance their experience using the device and the online system. As an example and not by way of limitation, a user may voluntarily provide personal or biometric information to the communication server 105. The user's privacy settings may specify that such information may be used only for particular processes, such as authentication, and further specify that such information may not be shared with any third-party or used for other processes or applications associated with the communication server 105. As another example and not by way of limitation, the communication server 105 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system or used by other processes or applications associated with the communication server 105. As another example and not by way of limitation, the communication server 105 may provide a functionality for a user to provide a reference image (e.g., a facial profile) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the communication server 105. Any of such restrictions on capture biometric and/or other personal data may also be applied to the client device 115.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the display sub-system 160 and the user input device 122 are integrated together, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during an audio/video call or in an audio/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels (or beams) each associated with a particular direction (or range of directions) in an environment surrounding the communication system 120.

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed for object detection, human detection, face detection, face recognition, gesture recognition, or other information that may be utilized to control functions of the communication system 120. Here, an estimated position in three-dimensional space of a detected entity (e.g., a target listener) in an image frame may be outputted by the camera sub-system 126 in association with the image frame and may be utilized by other components of the communication system 120 as described below. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video. The camera sub-system 126 may furthermore include a camera positioned to capture a time sequence of images. The camera sub-system 126 has a field-of-view based on characteristics of the one or more cameras, arrangement of the one or more cameras, position of the communication system 120 in the environment.

In some embodiments, the camera sub-system 126 may include a visual motion camera assembly that may determine depth information of the imaged environment. The visual motion camera assembly may include an imaging device and a visual motion camera controller. The visual motion camera controller receives temporal images of the environment as captured by the imaging device, and generates motion and depth information of the imaged environment based on optic flow computations performed with respect to the temporal images.

In some embodiments, the camera sub-system 126 may include an imaging device and a visual information analysis module that may determine depth information of objects in the imaged environment. The visual information analysis module may determine the depth of objects based on predefined size information of expected objects in the field of view of the imaging device.

In some embodiments, the camera sub-system 126 controls image capture based on certain adjustable imaging parameters such as exposure, white balance, etc. These imaging parameters may be controlled by automated processes, e.g., auto-exposure to control exposure, auto-white balance to control white balance, etc. The automated processes may adjust these imaging parameters in response to detected conditions such as brightness values, color values, etc., in the imaged scene. These automated processes may employ a parameter such as a convergence speed to control the speed of adjustment of the imaging parameters in response to detected conditions such as motion or brightness values. While performing rapid adjustments to the imaging parameter values may keep the imaging parameter values close to optimal values, these rapid adjustments may cause the presence of visible artifacts in the images caused by rapidly changing imaging parameter values. Performing a slower adjustment of the imaging parameter values may reduce such visible artifacts in the images, but the imaging parameter values may not optimal during the transitions. The presence of visual artifacts may significantly affect the appearance of an image particularly when a region of interest in the image includes a face. The convergence speed that is used in adjusting the imaging parameter values, therefore, has significant importance when a face is detected in the image frame, and particularly when there is significant movement of the face between imaged frames.

In some embodiments, the camera sub-system 126 adjusts a convergence speed of one or more imaging parameters of the one or more cameras based on computing a motion of an imaged face in the scene from image frames of video data. A sequence of image frames of video data received from a camera is used to detect motion data characterizing motion of a selected face in the scene. When it is determined that the detected motion data meets one or more predefined motion criteria, a motion vector corresponding to the characterized motion of the face is computed. A value is determined for a convergence adjustment factor for adjusting the convergence speed of one or more imaging parameters of the camera based on the computed motion vector. The convergence speed of the imaging parameters may be adjusted based on the determined value of the convergence adjustment factor.

The network interface 128 facilitates connection of the communication system 120 to the network 110. For example, the network interface 128 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The display sub-system 160 comprises an electronic device or an interface to an electronic device for presenting images or video content. For example, the display sub-system 160 may comprises an LED display panel, an LCD display panel, a projector, a virtual reality headset, an augmented reality headset, another type of display device, or an interface for connecting to any of the above-described display devices. In an embodiment, the display sub-system 160 includes a display that is integrated with other components of the communication system 120. Alternatively, the display sub-system 160 comprises one or more ports (e.g., an HDMI port) that couples the communication system to an external display device (e.g., a television).

The audio output sub-system 170 comprises one or more speakers or an interface for coupling to one or more external speakers that generate ambient audio based on received audio signals. In an embodiment, the audio output sub-system 170 includes one or more speakers integrated with other components of the communication system 120. Alternatively, the audio output sub-system 170 comprises an interface (e.g., an HDMI interface or optical interface) for coupling the communication system 120 with one or more external speakers (for example, a dedicated speaker system or television). The audio output sub-system 170 may output audio in multiple channels to generate beamformed audio signals that give the listener a sense of directionality associated with the audio. For example, the audio output sub-system 170 may generate audio output as a stereo audio output or a multi-channel audio output such as 2.1, 3.1, 5.1, 7.1, or any other standard configuration.

In embodiments in which the communication system 120 is coupled to an external media device such as a television, the communication system 120 may lack an integrated display and/or an integrated speaker, and may instead only communicate audio/visual data for outputting via a display and speaker system of the external media device.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, and user applications 156. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

Figure 2:
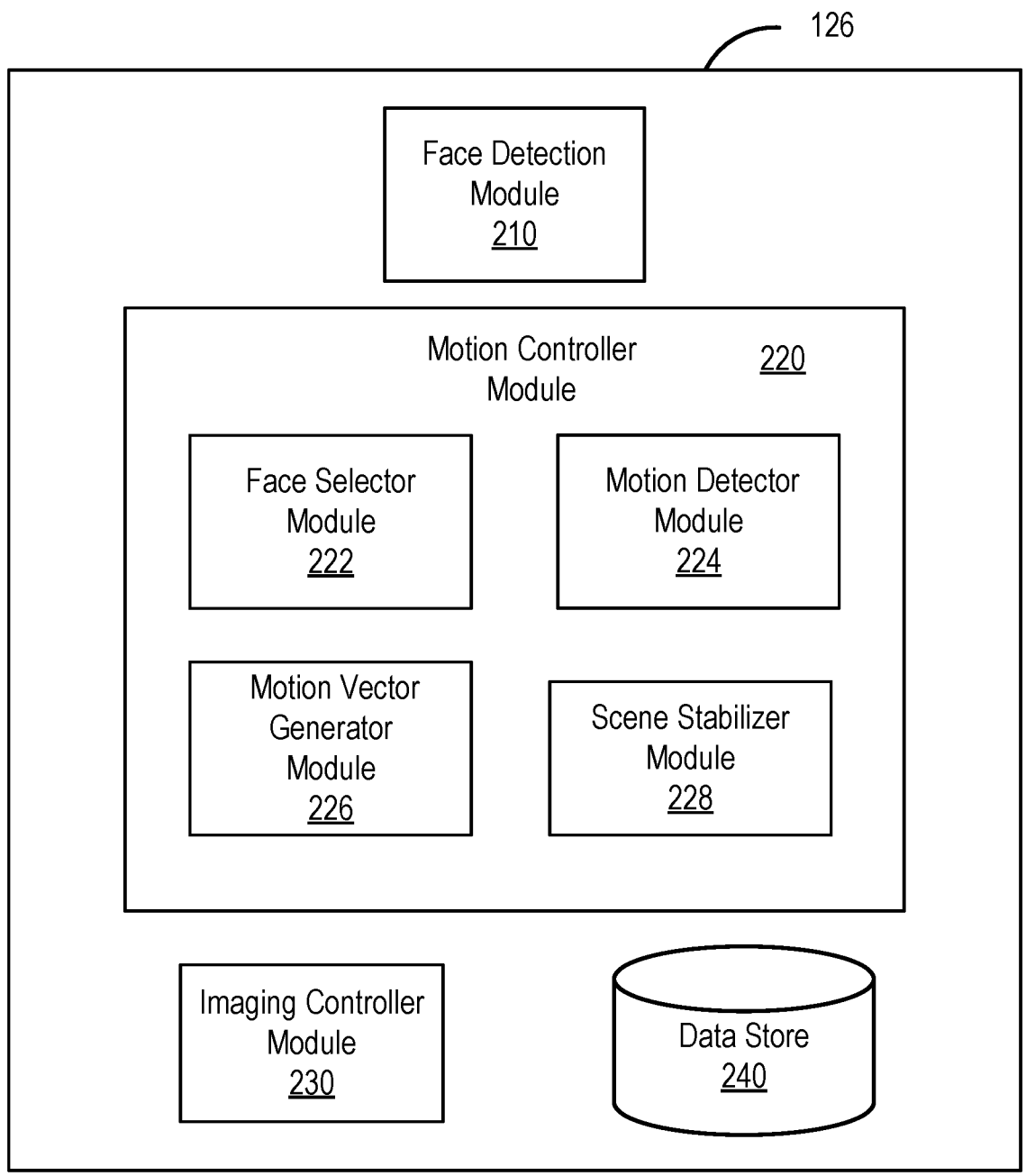
FIG. 2 is a block diagram of a smart camera module, in accordance with an embodiment.

FIG. 2 is a block diagram of the camera sub-system 126, in accordance with one or more embodiments. The camera sub-system 126 includes a face detection module 210, a motion controller module 220, an imaging controller module 230, and a data store 240. In alternative configurations, the camera sub-system 126 may include different and/or additional modules.

The face detection module 210 detects faces that may be present in image frames captured by the cameras of the camera sub-system 126. The face detection module 210 receives one or more image frames that correspond to one or more frames of video data that is captured by the cameras of the camera sub-system 126. The face detection module 210 may employ any of multiple face detection algorithms to detect human faces in an image frame, including, e.g., eigenface techniques using principal component analysis and deep learning based image analysis and recognition approaches, among others. In some embodiments, the face detection module 210 generates a list of detected faces for an image frame based on the detected human faces in the image frame, where each detected face may be associated with various face parameter values, e.g., face identifier, size descriptor, location coordinate data of the detected face in the image frame, quality parameters associated with the detected face, among others. The face detection module 210 may store the list of detected faces in association with the various face parameter values and in association with the image frame in the data store 240.

The motion controller module 220 computes a motion vector for a detected face in at least a pair of consecutive image frames, and uses the computed motion vector to determine a value of a convergence adjustment factor to control the convergence speed for adjusting the imaging parameters of the one or more cameras of the camera sub-system 126. The motion controller module 220 includes a face selector module 222, a motion detector module 224, a motion vector generator module 226, and a scene stabilizer module 228. In alternative configurations, the motion controller module 220 may include different and/or additional modules.

The face selector module 222 selects a face from a list of detected faces in an image frame. In some embodiments, the face selector module 222 receives the list of detected faces from the face detector module 210. The list of detected faces may include various face parameter values associated with each detected face in the image frame, e.g., face identifier, size descriptor, location coordinate data of the detected face in image frame, quality parameters of the detected face, among others. The face selector module 222 may select a face based on a value of the face parameter values. Generally, the face selector module 222 may select the face that is most prominent in the image and is predicted to be the most likely center of focus for the viewer. For example, the face selector module 22 may select the face based on a size of the face (e.g., selecting a largest face from the received list of one or more detected faces based on the associated size descriptor values associated with each detected face), a location of the face (e.g., selecting the face located closest to the center of an image frame), a quality parameter value of the detected face (e.g., selecting the face detected with the quality parameter that has a value greater than a predefined threshold), among others. In some embodiments, the face selector module 222 may select a face based on a weighted combination of various face parameter values. In some embodiments, the face selector module 222 may select a face from the list of received faces for a current image frame, and compare the selected face for the current image frame to a selected face for a previous image frame, where the previous image frame and the current image frame form a pair of consecutive frames in the received sequence of video frames. Based on the comparison, the face selector module 222 may determine if the selected face in the current image frame is the same as the selected face in the previous image frame. The face selector 222 may then provide an output to the motion detection module 224 indicating whether or not the faces match. If the faces match, the face selector 222 may furthermore provide the face parameter values associated with the selected face in the current and previous image frames to the motion detector module 224.

Figure 3:
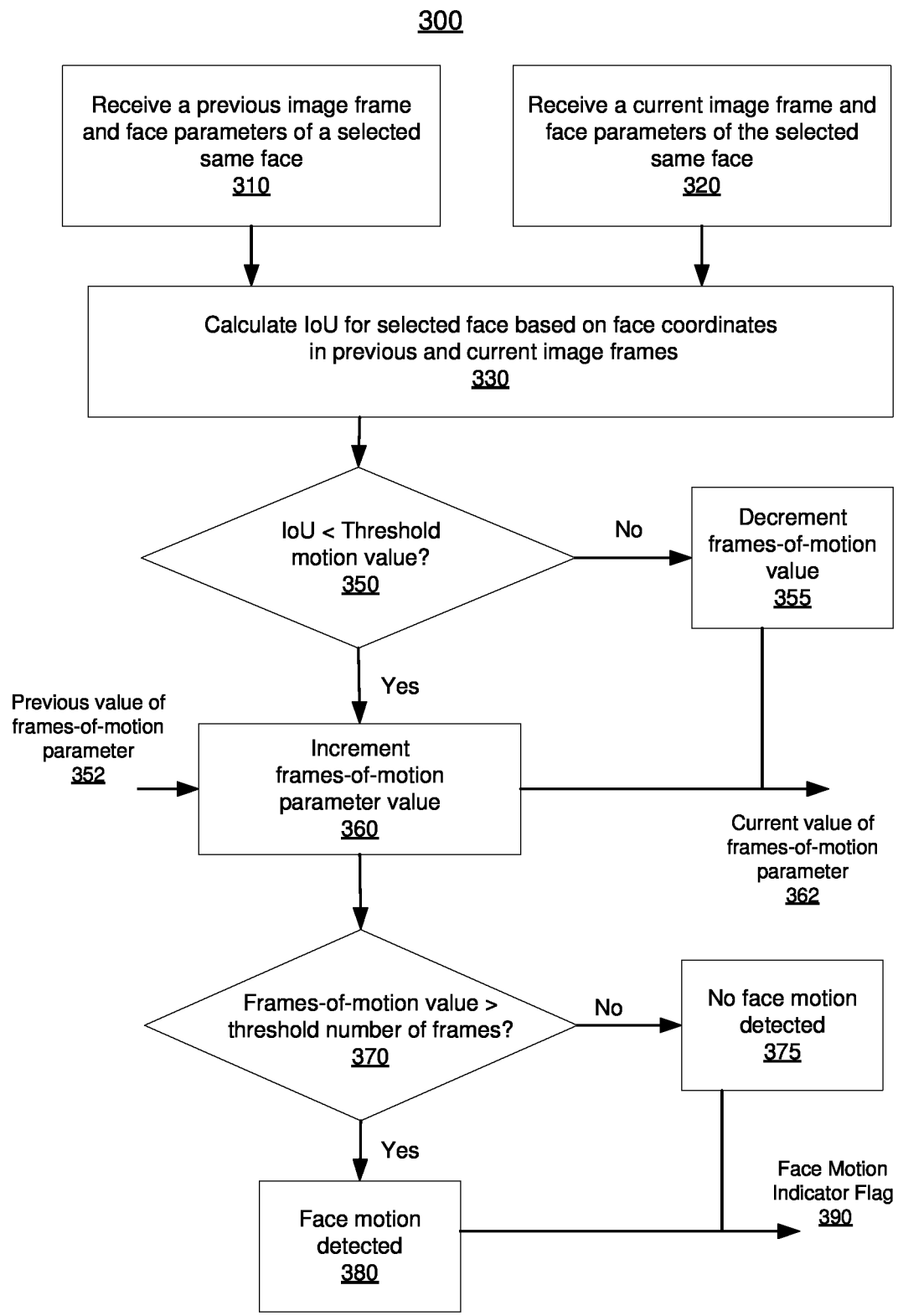
FIG. 3 is a flowchart illustrating a process of detecting motion of a selected face between two consecutive image frames, in accordance with an embodiment.

The motion detector module 224 detects motion data characterizing motion of the selected face between two image frames, and determines if the detected motion data meets predefined motion criteria. The motion detector module 224 receives image data for the current and previous frames, and face parameter values associated with the same selected face in the current and previous image frames. The motion detector module 224 also receives a value for a frames-of-motion parameter that indicates the number of prior frames (i.e., preceding the current frame) for which the value for the motion of the selected face between a pair of consecutive frames exceeds a predefined threshold motion value. Using the location coordinate data, e.g., the pixel location coordinate data associated with the selected face in each of the two image frames, the motion detector module 224 calculates a value for an intersection over union (IoU) parameter that may be used to describe a motion of the selected face between the previous and the current image frames. The calculated IoU value may be considered an indicator for face motion. Thus, a high IoU value indicates that there is a high area of overlap between the bounding boxes for the selected face in the two image frames, which in turn implies that the selected face may not have moved much. Similarly, a low IoU value may indicate that there is low overlap in the bounding boxes, thereby implying that the selected face may have had some motion. The motion detector module 224 compares the calculated IoU value to a predefined threshold motion value to update the value for the frames-of-motion parameter. The updated frames-of-motion parameter indicates the number of frames for which the value for the detected motion of the selected face between a pair of consecutive frames exceeds the predefined motion threshold value. The motion detector module 224 establishes that the selected face is moving between the two image frames when the updated frames-of-motion parameter value exceeds a predefined threshold number of frames. In other embodiments, the motion detector module 224 may establish that the selected face is moving between the two image frames using other computational processes to establish movement of the selected face between the two image frames, and may use other voting algorithms to establish that the selected face is exhibiting movement across image frame pairs in at least the predefined threshold number of frames. The motion detector module 224 may set an indicator flag to indicate that there is motion detected for the selected face between the two image frames FIG. 3 is a flowchart illustrating the process 300 of detecting motion of a selected face between a previous image frame and a current image frame as performed by the motion detector module 224, in accordance with an embodiment. The motion detector module 224 receives 310 image data of a previous image frame as well as associated face parameter values for a selected face. The motion detector module 224 also receives 320 image data of a current frame as well as associated face parameter values of the selected face that has been established as the same face as in the previous image frame from the face selector module 222. Using face location coordinate data, the motion detector module 224 calculates 330 the IoU value describing a motion of the selected face between the previous and the current image frames. The motion detector module 224 may calculate this by establishing bounding boxes for a location of the face in each of the two image frames. The bounding boxes are used by the motion detector module 224 to determine an area of overlap of the two bounding boxes with respect to the two image frames. The motion detector module 224 uses the two bounding boxes to also determine the area of union of the two bounding boxes. The motion detector module 224 calculates 330 the IoU value describing a motion of the selected face between the pair of consecutive image frames as a ratio of the area of overlap of the bounding boxes to the area of union of the two bounding boxes. The motion detector module 224 compares 350 the calculated IoU value to a predefined threshold motion value (e.g., establishing that the IoU value is less than the predefined threshold motion value). The motion detector module 224 also receives 352, from the face selector module 222, a previous value for a frames-of-motion parameter that indicates the number of prior frames for which the value for the motion of the selected face between a pair of consecutive frames exceeds a predefined threshold motion value. The comparison 350 is used to update the frames-of-motion parameter indicating the number of frames for which the value for the motion of the selected face between a pair of consecutive frames exceeds the predefined threshold motion value. When the calculated IoU value is not less than the predefined threshold motion value, the frames-of-motion parameter is decremented 355. When the calculated IoU value is less than the predefined threshold motion value, the frames-of-motion parameter is incremented 360. The motion detector module 224 compares 370 the incremented frames-of-motion parameter value to a predefined threshold number of frames. This comparison may be viewed as a voting across the sequence of frames to eliminate any false positives in the motion detection. The motion detector module 224 establishes 375 that there is no motion detected for selected face between the previous and current image frames when the incremented frames-of-motion parameter value does not exceed a predefined threshold number of frames. The motion detector module 224 establishes 380 that there is motion detected for selected face is moving between the previous and current image frames when the incremented frames-of-motion parameter value exceeds the predefined threshold number of frames. The motion detector module 224 may set an indicator flag 390 to indicate if there is movement detected for the selected face between the two image frames.

The motion vector generator module 226 computes a motion vector corresponding to a characterized motion of the selected face between a pair of image frames. In some embodiments, the motion vector generator module 226 receives image data of two consecutive image frames, including a current frame and a previous frame, in which a selected face has been established as the same face, as well as the associated face parameter values for the selected face in each of the two image frames. The motion vector generator module 226 also receives a value for the indicator flag that indicates motion above predefined criteria by the selected face between the pair of consecutive frames. When the indicator flag indicates that the motion detection module 224 has detected motion above predefined criteria by the selected face between the pair of consecutive frames, the motion vector generator module 226 proceed with performing the motion vector generator module 226 proceed computing the motion vector value. When the indicator flag indicates that the motion detection module 224 has not detected motion between a current and previous image frame, then no motion vector computation is performed by the motion vector generator module 226.

Computation of the motion vector corresponding to motion of the selected face between the current image frame and the previous image frame is typically a computationally expensive computation since it involves a matching search that is conducted over two image frames. In embodiments described herein, since the motion vector is computed in order to determine a convergence speed for adjusting imaging parameters of a camera in real-time, it is ensured that the computationally expensive search for the motion vector is performed by the motion vector generator module 226 only when the motion detector module 224 has determined through a computationally inexpensive IoU computation using the bounding boxes between selected face that there is detected motion of the selected face. Thus, the motion vector generator module 226 computes the motion vector only when the indicator flag is set to indicate that there is motion detected by the motion detector module 224. The indicator flag ensures that the computationally expensive motion vector computation proceeds only when detected motion of the selected face exceeds predefined threshold values.

In computing the motion vector, the motion vector generator 226 uses the location coordinate data, e.g., the pixel location coordinate data associated with the selected face in each of the two image frames, to establish a search window for minimizing a cost function. In some embodiments, the search window is a minimum rectangle that includes the two bounding boxes corresponding to the face in a pair of consecutive frames of the received sequence of video frames, and the computed motion vector is the motion vector that minimizes a sum of differences cost function that is based on pixel values using block matching over the established search window. Subsequently, the motion vector generator module 226 may send the computed motion vector to the scene stabilizer module 228 only when an absolute value of the computed motion vector is above a predefined motion vector threshold. For example, a back and forth motion of the selected face may computed as a motion vector with an absolute magnitude that is less than the predefined motion vector threshold. Thus, in the case of a back and forth motion of the selected face, the motion vector generator module 226 will not send the computed motion vector to the scene stabilizer module 228.

Figure 4:
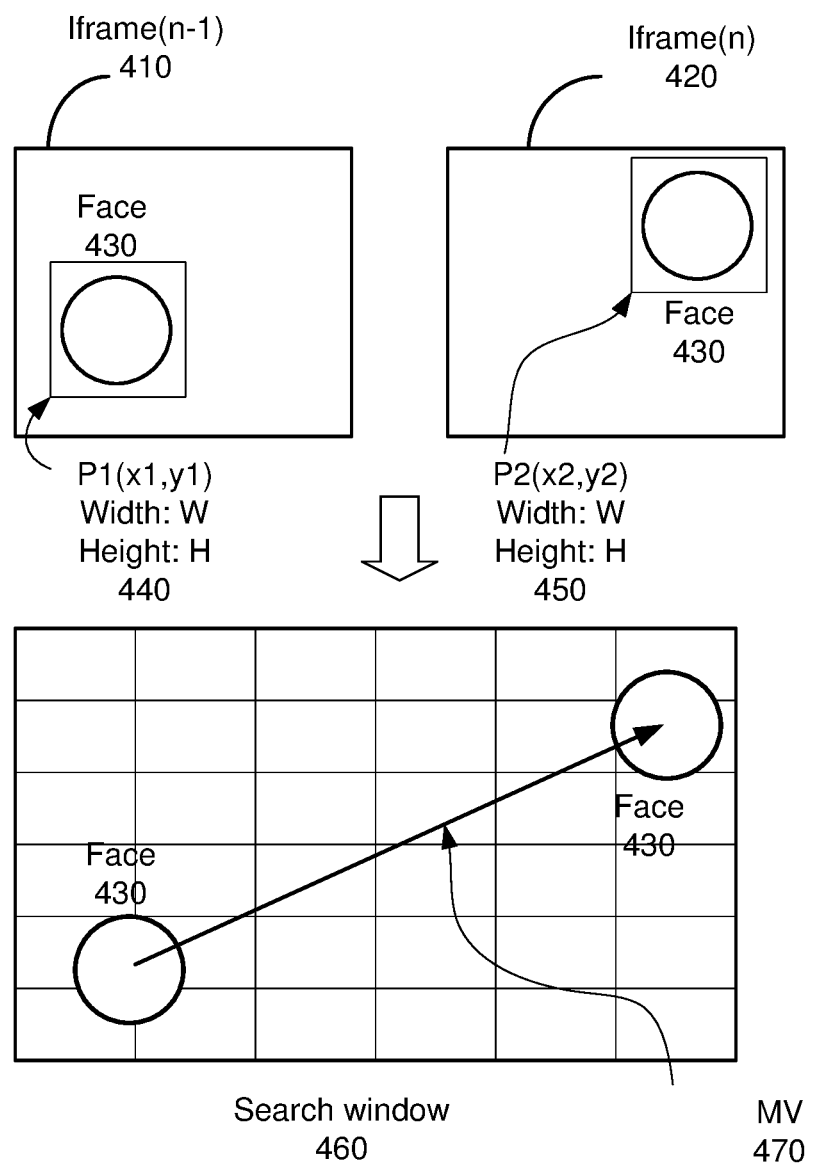
FIG. 4 is a depiction of an example search window that may be used over a pair of consecutive image frames for determining a motion vector that minimizes a cost function using block matching, in accordance with an embodiment.

FIG. 4 is a depiction of an example search window that may be established by the motion vector generator module 224 for using block matching to determine the motion vector that minimizes a sum of differences cost function. Given that Face 430 that has been selected as the same face in two consecutive image frames Iframe(n−1) 410 and Iframe(n) 420, the bounding box P1(x1,y1) 440 for the face 430 in Iframe(n−1) 410 is given by location coordinates (x1, y1), with width of bounding box being W, and height of bounding box being H, and the bounding box P2(x2,y2) 450 for the face 430 in Iframe(n) 320 is given by location coordinates (x2, y2), with width of bounding box being W, and height of bounding box being H. In this scenario, an example of a search window over which the cost function is minimized may be a minimum rectangle that includes the two bounding boxes corresponding to the face in a pair of consecutive frames of the received sequence of video frames, given by a search window 460 in which to compute the motion vector MV 470. The search window may be established as follows:

Search Window = the minimum rectangle with same face in both frames $= P(\min(x1, x2), \min(y1, y2))$ Width $= \max(x1, x2) + W - \min(x1, x2)$ Height $= \max(y1, y2) + H - \min(y1, y2)$ The motion vector is the vector MV that minimizes the sum of differences (SAD) cost function. It is computed using a block matching technique over blocks of pixels within the search window. In one embodiment, the SAD cost function may use a function $f$ that is based on a ratio of red to green pixel values (R/G ratio), and blue to green pixel values (B/G ratio), as shown in the SAD cost function example below. Since the frame rate may vary in different applications (e.g., 30 frames per second, 24 frames per second, etc.), the motion vector is generated over a normalized frame rate. An example of a cost function SAD (U,V) that is minimized over an N×N search window to generate a motion vector MV is shown below:

$$SAD(u, V) = \sum_{k=0}^{1} \sum_{j=0}^{N-1} \sum_{i=0}^{N-1} |f_n(x + i, y + j)[k] - f_{n-1}(x + U + i, y + V + j)[k]|$$

$f_n$ [0]: R/G of the pixel from the $n^{th}$ frame
$f_n$ [1]: B/G of the pixel from the $n^{th}$ frame
(x, y): block position in the n frame
(x+U, y+V): block position in the n−1 frame $(u,v) = _{(u,v) \in S}^{arg\ min} SAD(U,V)$, where $S=\{(U,V)$
$\|U\| \leq$ Width, $|V| \leq$ Height$\}$ $$\text{Normalized frame rate} = \frac{\text{Current frame rate}}{30.0}$$

MV=Normalized frame rate$(U,V)$

The scene stabilizer module 228 determines a value of a convergence adjustment factor based on the computed motion vector that is received from the motion vector generator module 226. The convergence adjustment factor is used subsequently for adjusting a convergence speed of imaging parameters of the cameras on the camera subsystem 126.

Figure 5:
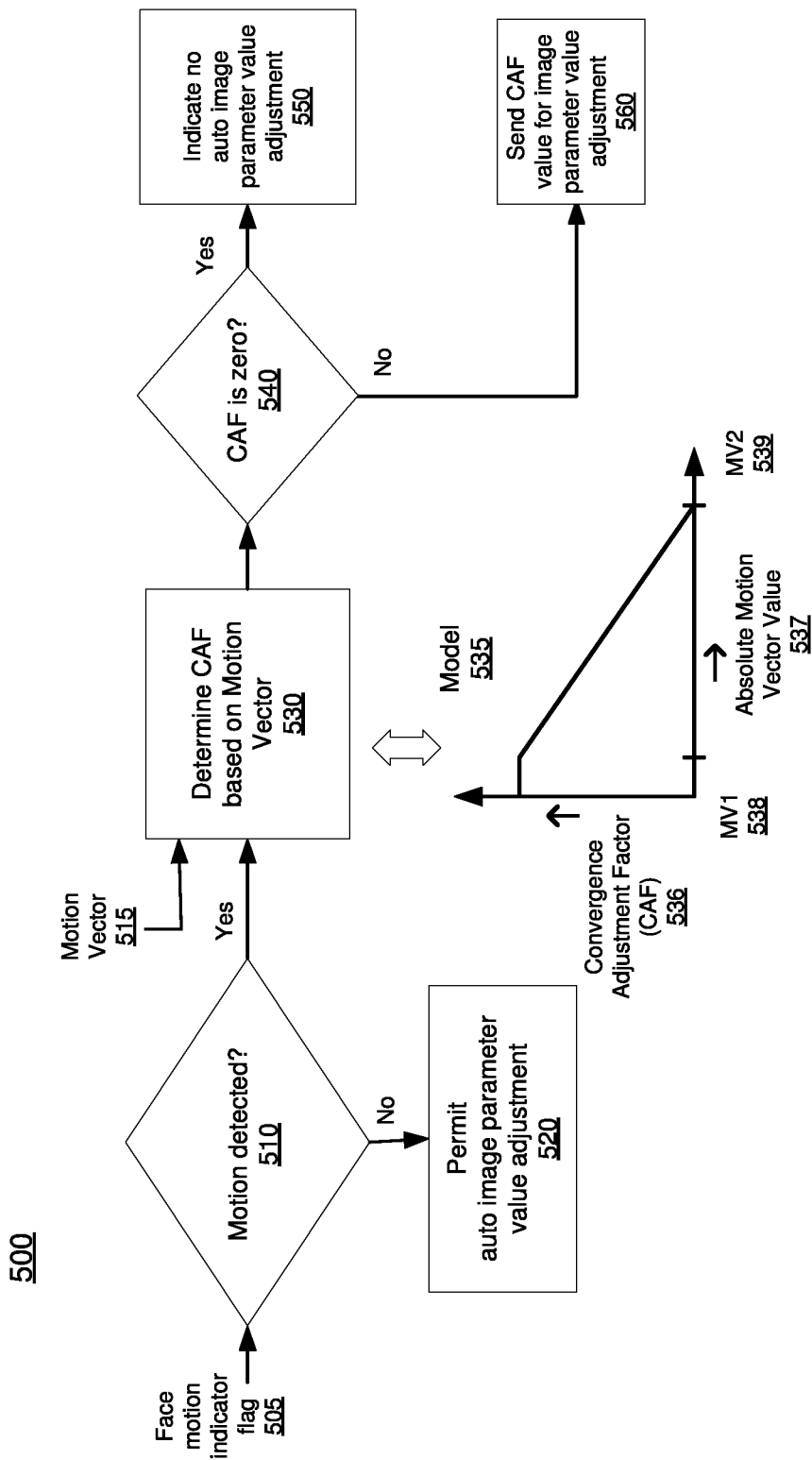
FIG. 5 is a flowchart illustrating a process for calculating a convergence speed adjustment factor based on a computed motion vector of a selected face, in accordance with an embodiment.

FIG. 5 is a flowchart illustrating a process 500 for determining the value of the convergence adjustment factor based on the computed motion vector as performed by the scene stabilizer module 228, in accordance with an embodiment. In some embodiments, the scene stabilizer module 228 may receive the face motion indicator flag 505 set by the motion detection module 224 that indicates if motion is detected for the selected face between two image frames. In response to determining 510, from the indicator flag 505, that no motion is detected, the scene stabilizer module 228 may permit 520 auto image parameter adjustment by the imaging controller module 230. In response to determining 510, from the indicator flag 505, that motion is detected for a selected face, the scene stabilizer module 228 may receive the computed motion vector 515 from the motion vector generator module 226. In some embodiments, the scene stabilizer module 228 determines 530 the value for the convergence adjustment factor (CAF) for adjusting a convergence speed of one or more imaging parameters of the cameras by applying a model that computes the adjustment parameter based on the computed motion vector. An example of a model 535 is depicted, where the CAF value 536 is mapped to an absolute value of the computed motion vector 537. Model 535 may first determine if the absolute value of the computed motion vector is above a predefined first motion vector threshold, MV1 538. In response to determining that the absolute value of the computed motion vector is above a predefined first motion vector threshold MV1 538, the CAF value may be linearly decreased based on the computed motion vector value. Furthermore, in response to determining that the computed motion vector is above a predefined second motion vector threshold MV2 539, the predefined second motion vector threshold being greater than the predefined first motion vector threshold, the CAF value may be set to zero. When it is determined 540 that the CAF value is zero, the scene stabilizer module 228 may indicate to the imaging controller module 530 that there should be no auto image parameter value adjustment 550. When it is determined that the CAF value is not zero, the scene stabilizer module 228 may send the determined CAF value to the imaging controller module 230 to be used for imaging parameter adjustment based on the CAF value.

The imaging controller module 230 controls imaging parameters for the camera is the camera sub-system 126. In some embodiments, the imaging controller module 230 receives the value for the convergence adjustment factor from the scene stabilizer module 228. The imaging controller module 230 adjusts a convergence speed for the imaging parameters in the camera system based on the value of the convergence adjustment factor. Examples of imaging parameters in the cameras include the auto exposure values and the auto white balance values. Thus, the imaging controller module 230 may use the received value of the convergence adjustment factor to adjust the convergence speed for performing the imaging tasks such as adjusting exposure and white balance.

The data store 240 is a memory, such as a read only memory (ROM), dynamic random-access memory (DRAM), static random-access memory (SRAM), or some combination thereof. The data store 240 stores information for the camera sub-system 126. The stored information may include a list of detected faces in association with the various face parameter values, such as face identifiers, size descriptors, location coordinate data of the detected faces in image frame, quality parameters of the detected faces and in association with the image frame, etc. The data store 240 may store values for predefined thresholds such as a threshold distance, a threshold number of frames, a lower motion vector threshold and a higher motion vector threshold. The data store may store other parameter values such as the indicator flag value as well as the frame rate.

In some embodiments, the various modules of the camera sub-system 126 may pass various parameter values directly to each other. In some embodiments, the various modules of the camera sub-system 126 may store parameter values in the data store 240, and retrieve parameter values as needed from the data store 240.

FIG. 6 is a flowchart illustrating a process 600 for adjusting image parameters of a camera based on detected motion of a face detected in a sequence of video frames, in accordance with an embodiment. In one embodiment, the process of FIG. 6 is performed by the camera sub-system 126 of FIG. 1 and the modules depicted in FIG. 2. The process 600 may include different or additional steps than those described in conjunction with FIG. 6 or in different orders than the order described in conjunction with FIG. 6.

The camera sub-system 126 receives 610 a sequence of image frames of video data of a scene from one or more cameras on a client device.

The camera sub-system 126 detects 620 motion data characterizing the motion of a face in the scene from the received sequence of image frames. In some embodiments, the camera sub-system 126 detects one or more faces along with associated face parameter values such as face identifier, a size descriptor, location coordinate data, quality parameters, etc., for each of the detected faces. If the camera sub-system 126 does not detect any faces in the image frames, the process 600 resets to receiving feature 610 with respect to a new image frame in the sequence of image frames. The camera sub-system 126 selects a face from the detected faces. In some embodiments, the camera sub-system 126 may select the largest face based on a comparison of the size descriptors associated with each of the detected faces. In some embodiments, the camera sub-system 126 may select the face whose location coordinates are closest to the center of the associated image from among the location coordinates of the detected faces. In some embodiments, the camera sub-system 126 may perform a weighted combination of the various face parameter values in selecting a face from the detected faces. Subsequent to selecting a face, the camera sub-system 126 compares the selected face from a current image frame from a selected face for a previous image frame and establishes that the selected face in the current image frame is the same as the selected face for the previous image frame. The camera sub-system 126 then calculates the motion of the selected face between the current and consecutive previous image frames as the detected motion data. Furthermore, if the camera sub-system 126 does not determine that a selected face is the same face in both the previous and current image frames, the process 600 does not proceed to detecting motion of a face but resets to receiving feature 610 with respect to a new image frame in the sequence of image frames.

The camera sub-system 126 determines 630 that the detected motion data meets predefined motion criteria. The camera sub-system 126 determines this by first estimating on a frame by frame basis that the selected face exhibits at least some threshold motion, and subsequently establishing that this motion of the selected face persists over a threshold number of frames in the image sequence. Thus, the camera sub-system 126 first determines that the detected motion data exceeds a predefined threshold motion value, and subsequently determines that the number of prior frames in the sequence of image frames where the detected motion of the selected face exceeds the predefined threshold motion value exceeds a threshold number of frames. In some embodiments, the camera sub-system 126 may set an indicator flag to indicate that the selected face meets the predefined motion criteria. Furthermore, when the camera sub-system determines 630 that the detected motion data does not meet predefined motion criteria, the imaging parameters are not adjusted, and the process 600 resets to receiving feature 610 with respect to a new image frame in the sequence of image frames.

The camera sub-system 126 computes 640 a motion vector corresponding to the motion of the selected face when the indicator flag is set to indicate that the detected motion meets the predefined motion criteria. In computing the motion vector of the selected face between the current and immediately previous image frame, the camera sub-system may employ a minimization of a cost function using a block matching technique over a search window. The camera sub-system 126 may establish the search window as the minimum rectangle that includes bounding boxes for the selected face in the current and previous image frames, and determine the motion vector that provides a solution to minimizing the cost function.

The camera sub-system 126 determines 650 a value for a convergence adjustment factor for adjusting a convergence speed of an imaging parameter of the cameras in the camera sub-system 126 based on the computed motion vector. In some embodiments, the camera sub-system may determine 450 the value of the convergence adjustment factor by applying a model to the absolute value of the computed motion vector.

The camera sub-system 126 adjusts 660 a convergence speed of one or more imaging parameters of the cameras in the camera sub-system 126 based on the determined value of the convergence adjustment factor. The convergence speed may be adjusted for imaging task engines such as those performing auto exposure or auto white balance for the cameras.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a sequence of image frames of video data of a scene from a camera on a client device;
    detecting motion data characterizing motion of a face in the scene from the received sequence of image frames;
    determining that the detected motion data meets one or more predefined motion criteria;
    responsive to determining that the detected motion data meets the one or more predefined motion criteria, computing a motion vector corresponding to the characterized motion of the face;
    determining a value of a convergence adjustment factor based on the computed motion vector for adjusting a convergence speed of an imaging parameter of the camera; and
    adjusting the convergence speed of the imaging parameter of the camera based on the determined value of the convergence adjustment factor.

2. The method of claim 1, wherein detecting motion data characterizing motion of the face in the scene from the received sequence of image frames comprises:
    receiving a list of one or more detected faces with associated face parameter values for a current image frame;
    selecting a face from the received list of one or more detected faces for the current image frame;
    determining that the selected face for the current image frame is the same as a selected face for a previous image frame; and
    calculating a value associated with a motion of the selected face between the current image frame and the previous image frame.

3. The method of claim 2, wherein selecting the face from the received list of one or more detected faces further comprises at least one of:
    determining that the selected face is the largest face from the received list of one or more detected faces based on the associated face parameter values; and
    determining that the selected face is located closest to the center of the current image frame in at least one of the current image frame and previous image frame from the received list of one or more detected faces based on the associated face parameter values.

4. The method of claim 2, wherein calculating the value associated with the distance moved by the selected face between the current image frame and the previous image frame comprises:
    calculating an area of overlap of bounding boxes for a location of the face in each of the current image frame and the previous image frame relative to an area of union of the bounding boxes for the location of the face in each of the current image frame and the previous image frame.

5. The method of claim 2, wherein determining that the detected motion data meets the one or more predefined motion criteria comprises:
    computing a proportion of prior frames in which the value for the motion of the selected face between the current image frame and the previous image frame exceeds a predefined threshold motion value; and
    responsive to determining that the computed proportion of prior frames exceeds a predefined threshold number of frames, determining that the motion data value meets the one or more predefined motion criteria.

6. The method of claim 1, wherein computing the motion vector corresponding to the characterized motion of the face in the scene comprises:
    establishing a search window that comprises a minimum rectangle that includes bounding boxes corresponding to the face in a pair of consecutive frames of the received sequence of video frames; and compute a motion vector based on minimizing a cost function using block matching over the established search window.

7. The method of claim 6, wherein the cost function comprises minimizing a sum of differences of a function based on red-green-blue pixel values.

8. The method of claim 6, wherein computing the motion vector based on minimizing the cost function using block matching over the established search window comprises computing the motion vector that generates the minimum cost function when performing block matching over the established search window.

9. The method of claim 1, wherein determining the value of the convergence adjustment factor based on the computed motion vector for adjusting a convergence speed of an imaging parameter of the camera comprises applying a model that determines the value of the convergence adjustment factor for the computed motion vector.

10. The method of claim 9, wherein applying the model that determines the value of the convergence adjustment factor for the computed motion vector comprises:

in response to determining that the computed motion vector is above a predefined first motion vector threshold, linearly decreasing the value of the convergence adjustment factor based on the computed motion vector value; and in response to determining that the computed motion vector is above a predefined second motion vector threshold, the predefined second motion vector threshold being greater than the predefined first motion vector threshold, establishing the value of the convergence adjustment factor as zero.

11. A non-transitory computer-readable medium comprising computer program instructions that, when executed by a computer processor of an online system, cause the processor to perform steps comprising:

receiving a sequence of image frames of video data of a scene from a camera on a client device;

detecting motion data characterizing motion of a face in the scene from the received sequence of image frames;

determining that the detected motion data meets one or more predefined motion criteria;

responsive to determining that the detected motion data meets the one or more predefined motion criteria, computing a motion vector corresponding to the characterized motion of the face;

determining a value of a convergence adjustment factor based on the computed motion vector for adjusting a convergence speed of an imaging parameter of the camera; and adjusting the convergence speed of the imaging parameter of the camera based on the determined value of the convergence adjustment factor.

12. The non-transitory computer-readable medium of claim 11, wherein detecting motion data characterizing motion of the face in the scene from the received sequence of image frames comprises:

receiving a list of one or more detected faces with associated face parameter values for a current image frame;

selecting a face from the received list of one or more detected faces for the current image frame;

determining that the selected face for the current image frame is the same as a selected face for a previous image frame; and calculating a value associated with a motion of the selected face between the current image frame and the previous image frame.

13. The non-transitory computer-readable medium of claim 12, wherein selecting the face from the received list of one or more detected faces further comprises at least one of:

determining that the selected face is the largest face from the received list of one or more detected faces based on the associated face parameter values; and determining that the selected face is located closest to the center of the current image frame in at least one of the current image frame and previous image frame from the received list of one or more detected faces based on the associated face parameter values.

14. The non-transitory computer-readable medium of claim 12, wherein calculating the value associated with the distance moved by the selected face between the current image frame and the previous image frame comprises:

calculating an area of overlap of bounding boxes for a location of the face in each of the current image frame and the previous image frame relative to an area of union of the bounding boxes for the location of the face in each of the current image frame and the previous image frame.

15. The non-transitory computer-readable medium of claim 12, wherein determining that the detected motion data meets the one or more predefined motion criteria comprises:

computing a proportion of prior frames in which the value for the motion of the selected face between the current image frame and the previous image frame exceeds a predefined threshold motion value; and responsive to determining that the computed proportion of prior frames exceeds a predefined threshold number of frames, determining that the motion data value meets the one or more predefined motion criteria.

16. The non-transitory computer-readable medium of claim 11, wherein computing the motion vector corresponding to the characterized motion of the face in the scene comprises:

establishing a search window that comprises a minimum rectangle that includes bounding boxes corresponding to the face in a pair of consecutive frames of the received sequence of video frames; and compute a motion vector based on minimizing a cost function using block matching over the established search window.

17. The non-transitory computer-readable medium of claim 16, wherein computing the motion vector based on minimizing the cost function using block matching over the established search window comprises computing the motion vector that generates the minimum cost function when performing block matching over the established search window.

18. The non-transitory computer-readable medium of claim 11, wherein determining the value of the convergence adjustment factor based on the computed motion vector for adjusting a convergence speed of an imaging parameter of the camera comprises applying a model that determines the value of the convergence adjustment factor for the computed motion vector.

19. The non-transitory computer-readable medium of claim 18, wherein applying the model that determines the value of the convergence adjustment factor for the computed motion vector comprises:

in response to determining that the computed motion vector is above a predefined first motion vector threshold, linearly decreasing the value of the convergence adjustment factor based on the computed motion vector value; and in response to determining that the computed motion vector is above a predefined second motion vector threshold, the predefined second motion vector threshold being greater than the predefined first motion vector threshold, establishing the value of the convergence adjustment factor as zero.

20. A system comprising:

a processor; and a non-transitory computer-readable medium comprising computer program instructions that when executed by the processor of an online system causes the processor to perform steps comprising:

receiving a sequence of image frames of video data of a scene from a camera on a client device;

detecting motion data characterizing motion of a face in the scene from the received sequence of image frames;

determining that the detected motion data meets one or more predefined motion criteria;

responsive to determining that the detected motion data meets the one or more predefined motion criteria, computing a motion vector corresponding to the characterized motion of the face;

determining a value of a convergence adjustment factor based on the computed motion vector for adjusting a convergence speed of an imaging parameter of the camera; and adjusting the convergence speed of the imaging parameter of the camera based on the determined value of the convergence adjustment factor.

\* \* \* \* \*